UNITED STATES PATENT OFFICE.

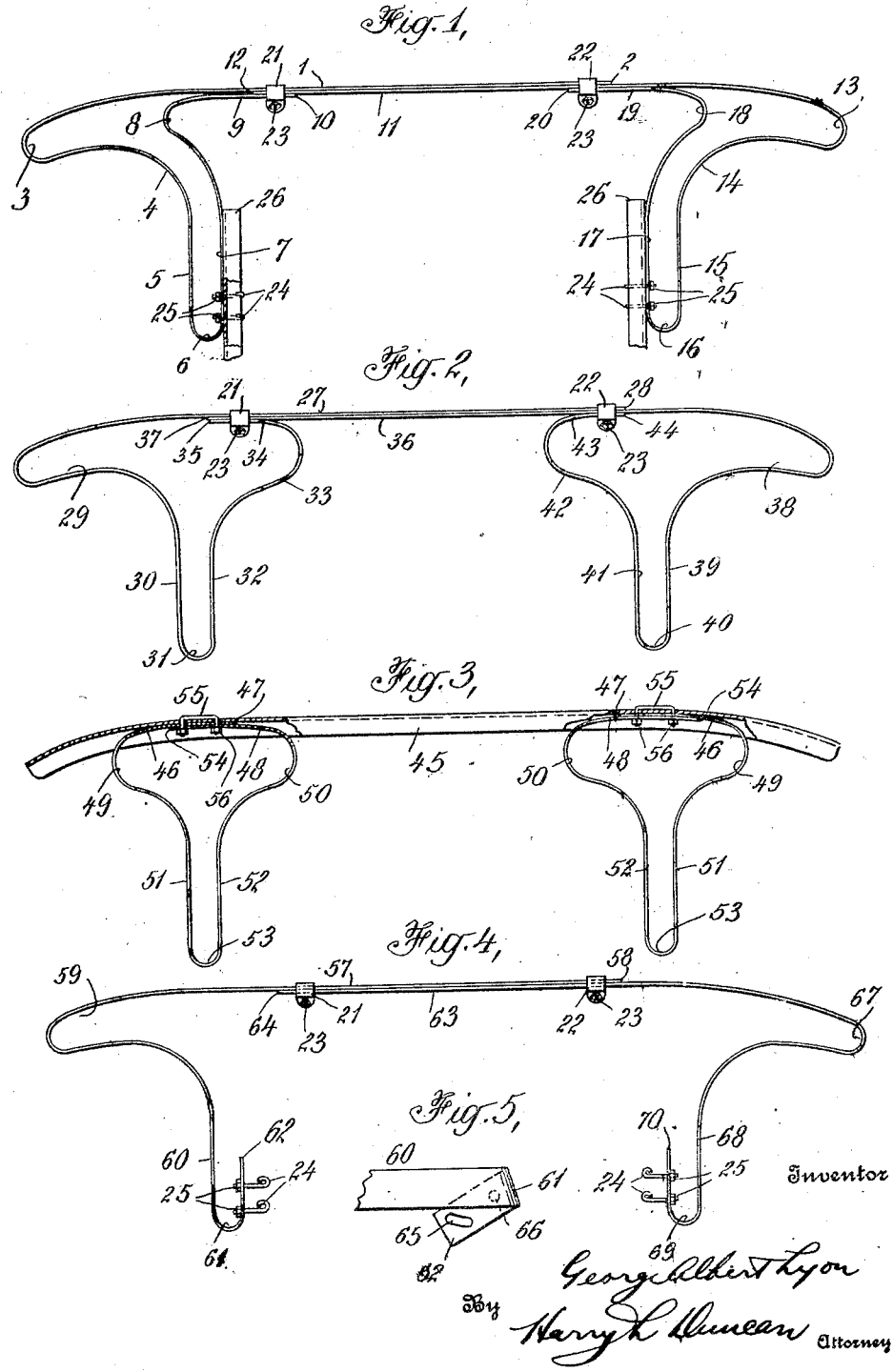

GEORGE ALBERT LYON, OF PHILADELPHIA, PENNSYLVANIA.

LOOPED-ATTACHER AUTOMOBILE-BUFFER.

1,351,050.  Specification of Letters Patent.  Patented Aug. 31, 1920.

Application filed January 14, 1920. Serial No. 351,233.

*To all whom it may concern:*

Be it known that I, GEORGE ALBERT LYON, a citizen of the United States, and resident of Philadelphia, county of Philadelphia, and State of Pennsylvania, have invented a certain new and useful Invention Relating to Looped-Attacher Automobile-Buffers, of which the following is a specification, taken in connection with the accompanying drawing.

This invention relates especially to buffers or bumpers for automobiles or other vehicles in which the attaching members which may advantageously be formed of spring steel or other resilient strip are formed with attacher loops so that an inturned protected securing portion may be provided to be clamped or otherwise secured to the vehicle frame. This inturned securing portion may in some cases be continued more or less parallel with the other side or portion of the attaching member and an outwardly or inwardly turned connector loop may be formed therein to give additional resilient yielding to this part of the buffer and form suitable connector portions which may be secured to the buffer front of resilient or other character. By forming an end loop on the attaching member adapted to extend into protective position in front of the automobile wheel the resilient strip may be extended inward from this end loop so as to extend past the connector loop and form in connection with a similar resilient strip connected to the other attacher loop a reinforced or doubled impact receiving portion of the buffer which may have such double strength construction throughout substantially the portion between the automobile frame members.

In the accompanying drawing showing in a somewhat diagrammatic way various illustrative embodiments of this invention, Figure 1 is a plan view showing an illustrative buffer.

Figs 2, 3 and 4 are plan views showing other illustrative forms of buffers for automobiles or other vehicles; and Fig. 5 is a partial side view of the Fig. 4 device.

The attaching members may be formed of one or more resilient strips of tempered spring steel, for example, which may be a quarter or three-eights of an inch or so thick and two inches or so wide, more or less. As indicated in Fig. 1 the attaching member may be formed with an attacher loop 6 and with an inturned protected securing portion 7 which may be laterally spaced inside of the outer portion 5 of the attaching member which may merge into an outwardly curved portion 4 and end loop 3 which may extend into protective position in front of the vehicle wheel, if desired. A front strip 1 may be connected to or formed integral with this end loop and may, if desired, have its end 2 extend substantially in front of the automobile frame member 26 on the other side of the vehicle, so that by using two such coöperating or connected impact receiving members 1, 11 a reinforced multiple thickness buffer front of desirable resilient character may readily be formed. If desired also the inturned securing portion 7, which may be formed with suitable apertures such as holes and slots to accommodate the hook bolts 24, may extend forward substantially parallel with the curved outer portion of the attaching member and may be provided with an outwardly turned connector loop 8 and inner connecting portion 9, the end 10 of this strip preferably extending in far enough to coöperate with the end 12 of the other impact receiving member 11, so that all of these strips may be connected by any suitable clamping devices, such for instance, as the inclosing clamping devices 21, 22 which may be tightened upon the strips when the bolts 23 are screwed home. The coöperating attaching member may be of generally similar form and may be provided with a similar resilient attacher loop 16 which when it spaces the outer protecting portion 15 of the attacher member two or three inches away from the inturned securing portion 17 thereof has a desirable resilient supporting action under collison conditions, since it makes possible a considerable additional resilient yield and thus cushions the force exerted through the hook bolts or other attaching devices 24, 25 on the frame member 26. It is not, however, necessary that the two portions or parallel strips of this attaching member should be spaced so far apart since with considerably less distance between them the outer protecting strip has a desirable action in preventing contact between the vehicle tire and the projecting ends or nuts 25 on the hook bolts which might otherwise tear or injure the tire fabric. These doubled attaching members also give additional strength and stiffness to the buffer when its ends are forced laterally out of position under collison conditions, for example. The relative resilient resistance offered by the two arms of the attaching member may of course be controlled and adjusted by the proportions of the different loops and curves therein and, for instance, by extending the outwardly turned connector loops 8, 18 farther outward toward the end loops 3, 13 a greater degree of resilient yield may be secured in this inner member or strip of the attaching members, although somewhat less strength or rigidity of support is thus secured.

Fig. 2 shows another illustrative arrangement in which the attacher loops 31 and 40 formed in the spring strip or other suitable attaching members serve to space apart the inturned securing portions 32, 41 which may be clamped, bolted or otherwise secured to the frame members or other parts of the automobile or vehicle, and if desired these inturned securing portions may be extended forwardly to form an inwardly turned connector loop such as 33 which may resiliently support the buffer front, and if desired, may be connected thereto as by clamping or bolting the end 35 of the corresponding connector portion 34 to the coöperating overlapping front or impact receiving members 27, 36, the inclosing clamps 21, 22 being used for this purpose, if desired. The outer or protecting strip of the attaching member, such as 30, may merge into the end loop 29 to give additional resilience to the reinforced buffer front and if desired the other attaching member may be similarly formed with an outer protecting portion 39 and end loop 38, the end of this strip extending inward to form the impact receiving member 36 and having an end 37 extending beyond the vehicle frame member, if desired. The inturned securing portion 31 of this attaching member may have a similarly inwardly turned connector loop 42 and the communicating connector portion 43 may be clamped or bolted to the other strips so as to secure them together and give the desired reinforcement and increased strength to this part of the buffer. Also when the adjacent strip ends 28, 44 and 35, 37 are substantially in line a pleasing appearance is given to the buffer front which as above described has ample strength under collision conditions so that for some purposes relatively thinner or lighter spring steel may be used for its manufacture.

Fig. 3 shows another form of buffer in which the attaching members may be formed with attacher loops 53 so that the inturned protected securing portion 52 which may be bolted or clamped to the vehicle frame in any suitable way is spaced somewhat away at least from the outer strip or portion 51 of this attaching member which may be formed with a yielding loop portion 49. A somewhat similarly shaped inwardly turned cushioning loop 50 may be formed on the other strip of the attaching member and the ends of these attaching member portions 46, 48 may gradually merge into the buffer front and be formed with overlapping ends 47, 54 which may be bolted or secured thereto in any suitable way. While any desired form of buffer front may be used in this connection a spring channel buffer front member 45 is illustrated to which these attaching members may be connected as by the U-bolts 55 extending through holes in the overlapping ends of the attaching members described and securely connected thereto by the nuts 56.

Fig. 4 shows still another form of this type of construction in which the attaching member 60 is formed with a resilient attacher loop 61 resiliently supporting the inturned and protected securing portion 62 of the attaching member as indicated in Fig. 5. This inturned securing portion or end of the attaching member may be downwardly bent in some cases and may be formed with suitable slots or apertures, such as the adjusting slot 65 and the hole or other aperture 66 through which the hook bolts or other attaching devices 24 may extend to clamp this securing portion or end of the buffer to the automobile frame member, for example. The end loop 59 may be formed on this attaching member and may be integral with the impact receiving portion 57 of the buffer strip which may have an end 58 about in line with the opposite frame member of the automobile so as to overlap the coöperating impact receiving member 63, the clamping devices 21, 22 being arranged to adjustably connect these overlapping strips adjacent their ends 58, 64, so that the appearance of the buffer front resembles the standard Lyon resilient buffer of Patent 1,198,246, of September 12, 1916. This second buffer strtip may be formed with an end loop 67 and with an outer protecting portion 68 which if desired may be substantially parallel to the inturned securing end 70 of the strtip and resiliently connected thereto by the attacher loop 69.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. The spring strip automobile buffer comprising two similar elements each having an impact receiving member and a connected outer end loop adapted to extend into protective position in front of the automobile wheel and an attaching member having a resilient attacher loop and an inturned protected securing portion adapted to be secured to the automobile frame member, said securing portion having an outwardly turned connector loop and connector portion adapted to be adjustably and removably clamped to the coöperating impact receiving member to form a double thickness reinforced buffer front.

2. The spring strip automobile buffer comprising two elements each having an impact receiving member, and a connected outer end loop adapted to extend into protective position in front of the automobile wheel and an attaching member having a resilient attacher loop and an inturned protected securing portion adapted to be secured to the automobile frame member, said securing portion having a connector loop and connector portion adapted to be clamped to the coöperating impact receiving member to form a double thickness reinforced buffer front.

3. The automobile buffer comprising two generally similar resilient strip elements each having an impact receiving member, and a connected outer end loop and attaching member having an attacher loop and an inturned protected securing portion adapted to be secured to the automobile frame member, said securing portion having a connector loop and connector portion adapted to be adjustably and removably clamped to the coöperating impact receiving member at one side of the reinforced buffer front.

4. The automobile buffer comprising two generally similar resilient strip elements each having an impact receiving member, and a connected outer end loop and attaching member having an attacher loop and a securing portion adapted to be secured to the automobile frame member, said securing portion having a connector portion adapted to be secured to the coöperating impact receiving member.

5. The automobile buffer comprising two generally similar resilient strip elements each having an impact receiving member, and an attaching member having an attacher loop and a securing portion adapted to be secured to the automobile frame member, said securing portion having a connector portion adapted to reinforce the coöperating impact receiving member.

6. The automobile buffer comprising two elements of flat resilient strip each having an impact receiving member, and a connected outer end loop and attaching member having a resilient attacher loop and an inturned protected securing portion formed with apertures and adapted to be secured to an automobile frame member, said securing portion having a connector portion adapted to be adjustably and movably connected to the coöperating impact receiving member to reinforce the same.

7. The automobile buffer comprising two elements of flat resilient strip each having an impact receiving member, and a connected outer end loop and attaching member having a resilient attacher loop and an inturned securing portion formed with apertures and adapted to be secured to an automobile frame member.

8. The automobile buffer comprising resilient spring steel strip members having attaching members formed with resilient attacher loops and adjacent inturned securing portions formed with apertures and adapted to be secured by hook bolt attaching devices to the frame members of an automobile, said attaching members having a protecting portion spaced away from said securing portion adjacent said attacher loop and having a connected end loop and impact receiving member to be adjustably connected to another part of the buffer to support and reinforce the same.

9. The automobile buffer comprising resilient strip members having attaching members formed with resilient attacher loops and adjacent inturned securing portions adapted to be secured to the frame members of an automobile, said attaching members having a protecting portion spaced away from said securing portion adjacent said attacher loop and having a connected end loop and impact receiving member to be adjustably connected to another part of the buffer to support and reinforce the same.

10. The automobile buffer comprising resilient strip attaching members formed with attacher loops and adjacent inturned securing portions adapted to be secured to the frame members of an automobile, said attaching members having a protecting portion spaced away from said securing portion adjacent said attacher loop and having a connected loop adapted to be connected to another part of the buffer to reinforce the same.

11. The automobile buffer comprising resilient strip ataching members formed with resilient attacher loops and adjacent inturned securing portions formed with apertures and adapted to be secured to the frame members of an automobile, said attacher members having a portion spaced away from said securing portion adjacent said attacher loop and having a curved connector portion adapted to be adjustably connected to another part of the buffer to support and reinforce the same.

12. The automobile buffer comprising resilient strip attaching members formed with attacher loops and adjacent inturned securing portions adapted to be secured to the frame members of an automobile, said attacher members having a portion spaced away from said securing portion adjacent said attacher loop and having a connector portion adapted to be connected to another part of the buffer to support and reinforce the same.

GEORGE ALBERT LYON.